United States Patent
Hejda et al.

(10) Patent No.: US 12,240,326 B2
(45) Date of Patent: Mar. 4, 2025

(54) METHOD AND DEVICE FOR OPERATING A WINDSHIELD DISPLAY SYSTEM WITH A COVERED DISPLAY DETECTION, AND WINDSHIELD DISPLAY SYSTEM

(71) Applicant: Bayerische Motoren Werke Aktiengesellschaft, Munich (DE)

(72) Inventors: Tomas Hejda, Neufahrn (DE); Sadzida Kratz, Munich (DE); Christopher Roelle, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/286,420

(22) PCT Filed: Feb. 10, 2022

(86) PCT No.: PCT/EP2022/053218
§ 371 (c)(1),
(2) Date: Oct. 11, 2023

(87) PCT Pub. No.: WO2022/238019
PCT Pub. Date: Nov. 17, 2022

(65) Prior Publication Data
US 2024/0181884 A1    Jun. 6, 2024

(30) Foreign Application Priority Data
May 10, 2021 (DE) .................. 10 2021 112 096.9

(51) Int. Cl.
*B60K 35/234* (2024.01)
*B60K 35/90* (2024.01)
(Continued)

(52) U.S. Cl.
CPC ............ *B60K 35/234* (2024.01); *B60K 35/90* (2024.01); *G02B 27/0101* (2013.01);
(Continued)

(58) Field of Classification Search
CPC .................. B60K 35/234; B60K 35/90; B60K 2360/785; B60K 2360/349; G06V 10/60;
(Continued)

(56) References Cited

U.S. PATENT DOCUMENTS

| | | |
|---|---|---|
| 2005/0140929 A1 | 6/2005 | Nambudiri et al. |
| 2011/0163996 A1 | 7/2011 | Wassvik et al. |

(Continued)

FOREIGN PATENT DOCUMENTS

| | | |
|---|---|---|
| DE | 10 2012 021 972 A1 | 5/2014 |
| DE | 10 2015 202 457 A1 | 8/2016 |

(Continued)

OTHER PUBLICATIONS

International Search Report (PCT/ISA/210) issued in PCT Application No. PCT/EP2022/053218 dated May 3, 2022 with English translation (4 pages).

(Continued)

*Primary Examiner* — Stephen G Sherman
(74) *Attorney, Agent, or Firm* — Crowell & Moring LLP

(57) ABSTRACT

A reflection display system for displaying a display image for a vehicle occupant of a motor vehicle by reflecting the display image on a windshield is provided. The system includes a display unit which is designed to display the display image on a display surface, a detection sensor system for detecting the displayed display image on the display surface, and a control unit which is designed to actuate the display unit for displaying purposes, ascertain detection information on the basis of the detected displayed display image, ascertain the presence of a foreign object on the display surface of the display unit on the basis of the displayed display image and on the basis of the detection information, and signal a disruption of the display if the (Continued)

presence of a foreign object on the display surface of the display unit has been ascertained.

9 Claims, 2 Drawing Sheets

(51) Int. Cl.
*G02B 27/01* (2006.01)
*G06V 10/60* (2022.01)
(52) U.S. Cl.
CPC ........ *G06V 10/60* (2022.01); *B60K 2360/349* (2024.01); *B60K 2360/785* (2024.01); *G02B 2027/0118* (2013.01); *G06V 2201/07* (2022.01)
(58) Field of Classification Search
CPC ............ G06V 2201/07; G02B 27/0101; G02B 2027/0118
See application file for complete search history.

(56) References Cited

U.S. PATENT DOCUMENTS

| | | | |
|---|---|---|---|
| 2012/0205175 A1 | 8/2012 | Masserang et al. | |
| 2014/0333647 A1 | 11/2014 | Lee | |
| 2015/0309206 A1 | 10/2015 | Kuntze et al. | |
| 2017/0168295 A1* | 6/2017 | Iwami | G02B 27/0093 |
| 2018/0104721 A1 | 4/2018 | Dannan | |
| 2018/0131880 A1* | 5/2018 | Hicks | H04N 5/58 |
| 2019/0204592 A1 | 7/2019 | Fujita | |
| 2019/0212550 A1 | 7/2019 | Fujita | |
| 2019/0271905 A1 | 9/2019 | Fujita | |
| 2021/0213883 A1 | 7/2021 | Lu et al. | |
| 2022/0146818 A1 | 5/2022 | Inoue et al. | |

FOREIGN PATENT DOCUMENTS

| | | | | |
|---|---|---|---|---|
| EP | 2 233 962 A2 | | 9/2010 | |
| EP | 2 693 253 A1 | | 2/2014 | |
| EP | 2 693 256 A1 | | 2/2014 | |
| JP | 2009157253 A | * | 7/2009 | ......... G02B 27/0006 |
| JP | 2010-243940 A | | 10/2010 | |
| JP | 2016-197768 A | | 11/2016 | |
| JP | 2018-4951 A | | 1/2018 | |
| KR | 10-2014-0131760 A | | 11/2014 | |
| KR | 20170069178 A | * | 6/2017 | |
| WO | WO-2018134012 A1 | * | 7/2018 | ................ G01J 1/44 |
| WO | WO 2020/189646 A1 | | 9/2020 | |
| WO | WO 2020/250739 A1 | | 12/2020 | |

OTHER PUBLICATIONS

German-language Written Opinion (PCT/ISA/237) issued in PCT Application No. PCT/EP2022/053218 dated May 3, 2022 with English translation (9 pages).

German Search Report issued in Application No. 10 2021 112 096.9 dated Feb. 1, 2022 with partial English translation (11 pages).

International Search Report (PCT/ISA/210) issued in PCT Application No. PCT/EP2022/058904 dated Jul. 13, 2022 with English translation (6 pages).

German-language Written Opinion (PCT/ISA/237) issued in PCT Application No. PCT/EP2022/058904 dated Jul. 13, 2022 with English translation (12 pages).

German Search Report issued in German Application No. 10 2021 112 097.7 dated Jan. 28, 2022 with partial English translation (11 pages).

U.S. Non-Final Office Action issued in U.S. Appl. No. 18/286,425 dated Aug. 30, 2024 (25 pages).

* cited by examiner

METHOD AND DEVICE FOR OPERATING A WINDSHIELD DISPLAY SYSTEM WITH A COVERED DISPLAY DETECTION, AND WINDSHIELD DISPLAY SYSTEM

CROSS REFERENCE TO RELATED APPLICATION

This application contains subject matter related to U.S. application Ser. No. 18/286,425, entitled "Method and Device for Operating a Windshield Display System with a Covered Display Detection, and Windshield Display System," filed on even date herewith.

BACKGROUND AND SUMMARY OF THE INVENTION

The invention relates to windshield display systems, in particular reflection display systems, such as PHUD, for motor vehicles. In particular, the present invention relates to measures for detecting a foreign object located in the optical beam course of the windshield display system.

Reflection display systems, such as PHUD, comprise a display unit arranged on the upper side of the dashboard, the display of which reflects on the inside of the windshield so that the reflection image can be perceived by a vehicle occupant. The display unit is arranged somewhat depressed on the upper side of the dashboard here so that a direct view of the display surface of the display unit is prevented, in order to thus avoid blinding of the user by light directly incident into the eye.

However, due to the arrangement of the display unit in such a depression on the upper side of the dashboard, foreign objects which rest on the display unit are also not readily visible from the normal eye position of the vehicle occupant. However, these foreign objects lie in the beam path of the display image and can thus conceal parts of the display, so that possibly legally relevant display symbols, such as speed limit signs, chamber lights, remaining range, and the like are not visible, but the absence of these display symbols is also not noticed since they are not permanently displayed.

A use of a cover pane, as is used in classic head-up displays, for example, is disadvantageous in such reflection display devices, since new reflections of ambient light on the windshield can thus arise, which significantly impair the perceptibility of the reflection image in the event of high ambient brightness.

It is an object of the present invention to provide an improved method for detecting concealment of a display image in a reflection display system.

This object is achieved by a reflection display system and by a method for a detection device and a display system according to the independent claims.

Further embodiments are specified in the dependent claims.

According to a first aspect, a reflection display system is provided for displaying a display image for a vehicle occupant of a motor vehicle by reflection of the display image on a windshield, comprising:

a display unit, which is designed to display the display image on the display surface;
a detection sensor system for acquiring the displayed image on the display surface; and
a control unit, which is designed
  to activate the display unit for display;
  to ascertain detection information depending on the detected displayed display image,
  to establish the presence of a foreign object on the display surface of the display unit depending on the displayed display image and depending on the detection information; and
  to signal a disturbance of the display when the presence of a foreign object on the display surface of the display unit is established.

Foreign objects which are deposited on the dashboard can entirely or partially conceal components for displaying information via the windshield. However, if the reflection display system is used to display safety-relevant information, it is necessary to be able to distinguish a non-display of information from a blocking of the display of the information by a resting foreign object.

Foreign objects in the context of this invention can be arbitrary objects which obstruct the perception of a display image, such as pieces of clothing, papers, and the like.

In particular if the display unit is arranged in a depression on the upper side of the dashboard, however, foreign objects which rest on the display unit are not readily visible from the normal eye position of the vehicle occupant. However, these foreign objects lie in the beam path of the display image and can thus conceal parts of the display, so that possible safety-relevant and legally prescribed display symbols, such as speed display, chamber lights, remaining range, and the like are not visible. However, the absence of these display symbols cannot be readily noticed, since they are not permanently displayed.

With the aid of the above reflection display system, it is possible to recognize whether the display unit is free of resting foreign objects on the display surface. This is achieved by virtue of detection information being ascertained depending on the detected displayed display image and the presence of the foreign object on the display surface of the display unit being established by comparing the displayed display image and the detection information.

It can thus be detected whether the beam path of the reflection display system is disturbed by a foreign object on the display surface. A detection of such an interruption of the display of the reflection display system is essential to be able to signal a warning or other countermeasures. The above reflection display system thus enables automated detection of a foreign object disturbing the display image on the display surface of the display unit.

Furthermore, the display unit can be arranged in the depression so that the display image is not perceptible directly in the eye region.

Furthermore, the control unit can be designed to activate the display unit to output a test image having a display property, to acquire an acquisition image of the test image as acquisition information, and to check the presence of the display property on the basis of the acquisition image in order to signal a disturbance of the display when the display property with respect to the acquisition image is not present.

In particular, the test image can correspond to a display having different display information than the display image and/or an image having a different display property than the display image, in particular the overall brightness of the image.

One concept of the above reflection display system is to use the detection sensor system to evaluate specific properties of the display image. This display property is changed by a foreign object concealing the display image, so that the presence of a foreign object can be concluded due to deviation of the acquisition of the detection sensor system from an expected acquisition.

According to one embodiment, the acquisition sensor system can include an image acquisition sensor system, which is designed to acquire the display of the display surface directly or indirectly via one or more reflections, wherein the display of the display surface is acquired indirectly via a further reflection region on the windshield or via a reflection in the eye of a vehicle occupant.

In particular, the display property can comprise a periodic display of a test image for an imperceptible period of time on the display surface, wherein the control unit is designed to ascertain the display of the test image as the acquisition image, and to determine the presence of the foreign object on the display surface by comparing the acquisition image to the test image.

It can be provided that the display property comprises a display of a test image in nonvisible light, wherein the control unit is designed to ascertain the display of the test image in the nonvisible light as the acquisition image and to determine the presence of the foreign object on the display surface by comparing the acquisition image to the test image.

Furthermore, the detection sensor system can comprise a brightness sensor, which is designed to acquire an overall brightness of the display image directly or indirectly via one or more reflections as an acquisition brightness, wherein the control unit is designed to ascertain the presence of the foreign object on the display surface in dependence on the acquisition brightness and a reference brightness.

In particular, the reference brightness can be ascertained as the overall brightness of the display image to be displayed.

According to a further aspect, a motor vehicle is provided, comprising:
a dashboard between a windshield of the motor vehicle and a steering column;
the above reflection display system.

According to a further aspect, a method for detecting a foreign object on a display unit of a reflection display system, which causes a reflection of a display image on a windshield in an eye region of a vehicle occupant, is provided having the following steps:
displaying the display image on the display surface;
acquiring the displayed display image on the display surface by way of a detection sensor system;
ascertaining acquisition information depending on the acquired displayed display image,
establishing the presence of a foreign object on the displayed surface of the display unit depending on the displayed display image and depending on the acquisition information; and
signaling a disturbance of the display if the presence of a foreign object on the display surface of the display unit is established.

Embodiments are explained in more detail hereinafter on the basis of the appended drawings. In the figures:

DETAILED DESCRIPTION OF THE DRAWINGS

Figure 1A:
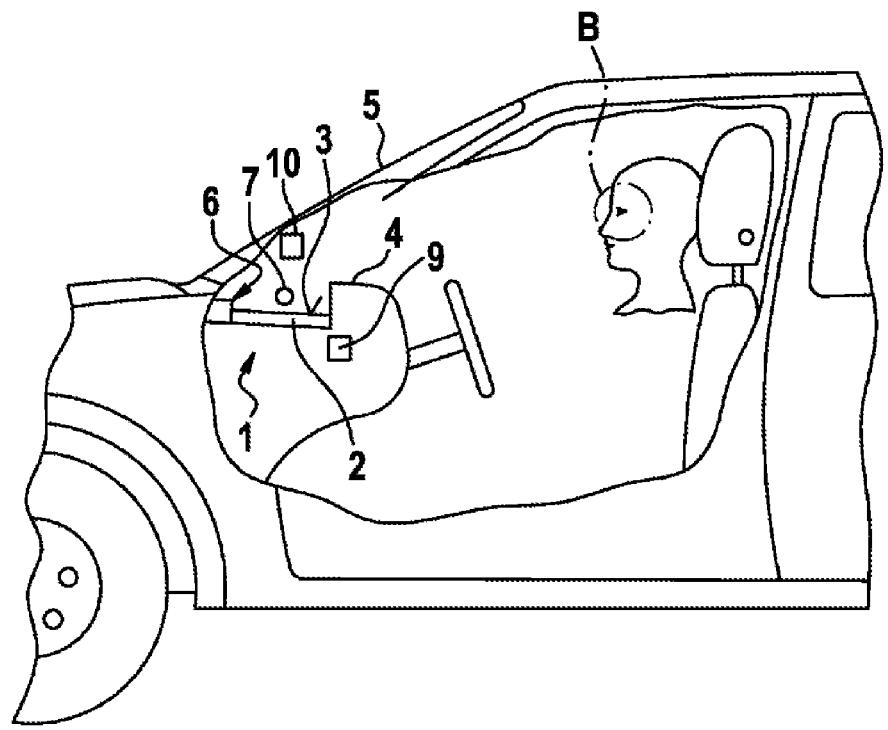
FIG. 1 shows a schematic cross-sectional view of a reflection display system in a motor vehicle having a light barrier as a detection sensor system.
Figure 1B:
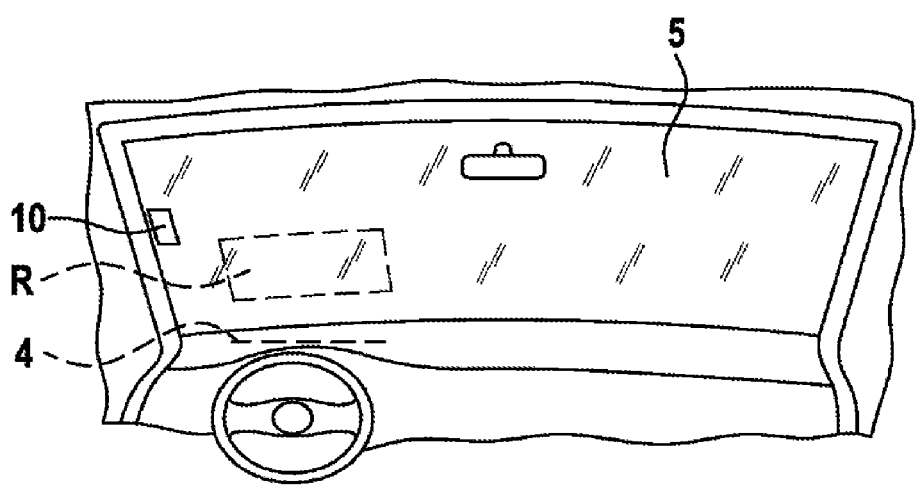

FIGS. 1a and 1b show a schematic cross-sectional view through a motor vehicle having a reflection display system 1 and a view from the viewpoint of the driver of the motor vehicle. The reflection display system is arranged on an upper side of a dashboard 4 and includes a display unit 2, which comprises a display surface 3 for displaying a display image. The display unit 2 is arranged on the upper side of the dashboard 4 below a windshield 5.

The display surface 3 is aligned with respect to the windshield 5 so that a display image displayed on the display surface 3 of the display unit 2 is reflected at a lower region of the inside of the windshield 5 and can be perceived by vehicle occupant in an eye region B. The alignment of the display unit 2 or its display surface can thus preferably be essentially parallel to the vehicle longitudinal and transverse axis or can deviate therefrom by an angle of for example not more than 0-20°.

The display unit 2 can be activated by a control unit 9 in order to output a desired display image which is intended to be perceived by the vehicle occupant.

The display unit 2 can be attached in a depression 6 of the dashboard, so that it is not possible for the vehicle occupant to view the display surface 3 of the display unit 2 directly and blinding of the vehicle occupant by direct light from the display surface 3 in the eye region B is avoided. Furthermore, the display surface 3 of the display unit 2 is aligned so that a displayed display image is reflected on the inside of the windshield 5 and can be perceived by a vehicle occupant in an eye region B as a reflection image in a reflection region R on the windshield 5.

The display unit 2 can be designed as a light-emitting display unit 2 and can preferably be designed as an LCD display unit having a backlight of high brightness or as a micro-LED display unit, in order to provide a brilliant display image, so that the generated reflection can be perceived even with a high level of ambient brightness above the corresponding region of the windshield 5.

Since the display unit 2 is arranged in the depression 6 on the upper side of the dashboard 4, a foreign object 7 can also enter this depression and thus come to rest on the display surface 3 of the display unit 2. A display image displayed on the display unit 2 then cannot be perceived or can only be perceived partially as a reflection image by a vehicle occupant.

To detect whether the foreign object 7 rests on the display surface 3 or not, a detection sensor system 10 is provided, which is first schematically indicated in FIGS. 1a and 1b. The detection sensor system 10 can comprise one or more camera systems or one or more brightness sensors and can possibly combine them in order to detect a foreign object 7 resting on the display surface 3.

The detection sensor system 10 has a communication connection to the control unit 9, which, upon a detection of the foreign object 7, signals the blocking of the display by the foreign object 7 in a suitable manner to the vehicle occupant, in particular the driver of the motor vehicle, for example by an acoustic and/or visual warning signal. The visual warning signal can be output via a separate output unit or via the display unit 2. In the latter case, for example, the warning signal can be output via the entire display surface, so that the vehicle occupants can perceive the warning signal in spite of the resting foreign object 7 (partially concealing the display image). For example, the warning signal can be displayed as a flashing planar display on the display surface 3.

Figure 2:
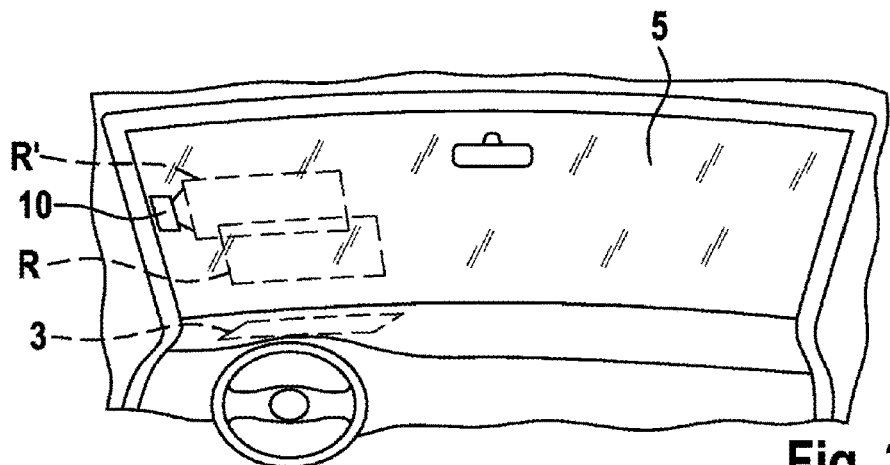
FIG. 2 shows a cross-sectional view of a reflection display system having a detection sensor system directed via a further reflection region on the display surface for evaluating a display property of the displayed display image.

A cross-sectional view of an exemplary embodiment is shown in FIG. 2, in which the detection sensor system 10 comprises an image acquisition sensor system 10a. The image acquisition sensor system 10a can include, for example, one or more cameras, which are directed directly or indirectly, i.e., for example, via a corresponding reflection region R' of the windshield 5, which can differ from the reflection region R, on the display surface 3 of the display unit 2. In this case, the image acquisition sensor system 10a is to acquire the entire region of the display image. The image acquisition sensor system 10a is arranged here so that it is not located in the field of view of the driver and/or the other vehicle occupants and in the field of vision of the reflection image in the reflection region R, so that an undisturbed view of the driver and/or the other vehicle occupants is possible. In particular not interrupting the beam path between the display surface 3, the reflection region on the windshield 5, and the eye region B.

To establish that a foreign object 7 is resting on the display surface 3, the control unit 9 can activate the display unit 2 in order to apply an additional characteristic to the display image to be displayed as a display property. The control unit 9 can receive an acquisition image by evaluating a display image acquired by the image acquisition sensor system 10a and can establish partial concealment of the display image by checking the acquisition image with respect to the display property. The acquisition image acquired by the image acquisition sensor system 10a is checked here as to whether it includes the display property of the applied additional characteristic.

The control unit 9 can activate the display unit 2, for example, in order to periodically replace or overlay the display image to be displayed with a test image, which is displayed so briefly that it is not perceptible by the human eye. For example, the test image can be displayed for periods of time between 5 ms and 40 ms at a repetition frequency of, for example, 1 Hz. Accordingly, the acquisition image of the image acquisition sensor system 10a can be evaluated in order to detect the periodically displayed test image and provide it as the acquisition image. A comparison of the acquisition image to the displayed test image enables the presence of a foreign object 7 on the display surface 3 to be established in a simple manner. In particular when it is established that the acquisition image does not completely correspond to the displayed test image, a disturbance of the display of the reflection display system 1 can be presumed.

Alternatively, the test image can also be displayed using non-visible light, in particular infrared light, so that it is overlaid on the display image to be displayed. The periodic intermittent display of the test image is then not necessary. For this purpose, the image acquisition sensor system 10a in particular has to be made sensitive to the wavelengths of the nonvisible light.

Alternatively, the detection sensor system 10 can also include a brightness sensor 10b, which is directed directly or indirectly on the display image of the display surface 3 and acquires an overall acquisition brightness. By evaluating the overall acquisition brightness using a reference brightness to be expected, the concealment of the display image by a foreign object 7 can be detected. If it is established that the overall acquisition brightness is less than the reference brightness to be expected, a disturbance of the display by the display unit 2 is established and signaled accordingly.

The acquisition brightness can continuously acquire the brightness of the overall display image and evaluate it using a reference brightness ascertained from the display image. Alternatively, as described above, a test image can be periodically output and the acquisition brightness can be determined only in relation to the display of the test image. The corresponding reference brightness then results from the overall brightness of the test image.

The reference brightness results by way of the display of the displayed image, in particular as the total of the brightnesses of the individual pixels.

In order to compensate for the influence of the ambient brightness, for example, due to sunlight incident on the display surface, in the case of the periodic display of the test image and the brightness evaluation only in relation to the displayed test image, two test images having different total brightnesses can be displayed in chronological succession. By evaluating the difference of the acquisition brightnesses acquired accordingly by the brightness sensor 10b in relation to a difference of the reference brightnesses ascertained from the test images or assigned thereto, the influence of the ambient brightness can be calculated out, since under the assumption that the ambient brightness does not change during the acquisition of the two test images, the brightness difference between the two test images with unconcealed display surface has to remain constant independently of the ambient brightness.

In an alternative embodiment, the detection sensor system 10 can be directed onto the eye region B, in particular onto the eyes of the vehicle occupant. In this case, the display image is assessed in accordance with the above described method. Evaluated indirectly by reflection on the windshield 5 and in the eyes of the vehicle occupant. Pixels of the test image which are not reflected via the image acquisition sensor system in the eye of the vehicle occupant are detected as concealed and the foreign object 7 is thus established.

To establish that the foreign object 7 is resting on the display surface 3, the control unit 9 can activate the display unit 2 in order to apply an additional characteristic as a display property to the display image to be displayed. The control unit 9 can establish partial concealment of the display image by evaluating an acquisition image acquired by the image acquisition sensor system 10a on the display surface 3.

The display property of the display image can be a periodic display of a test image sequence as a sequence of multiple test images which each address different pixels of the display surface 3. Thus, for example, a periodically occurring successive activation of individual pixels or groups of pixels (for example pixel segments) can be carried out on the display surface 3. Thus, for example, display segments can be activated in chronological succession like a grid, so that each of the pixels or each of the regions of the display surface 3 is activated once within the test image sequence.

This enables the detection sensor 10 to be designed as a simple brightness sensor 10b. This is operated to generate a signal sequence, which indicates the brightnesses of the test images of the test image sequence in succession, by corresponding acquisition of the test image sequence, i.e., upon acquisition at the corresponding display points in time. By detecting a signal gap having reduced brightness, a concealed area on the display surface 3 can be determined. If a brightness corresponding to the test image thus cannot be detected at a predetermined display point in time of one of the test images of the test image sequence, a concealment of the corresponding surface region can thus be concluded. The surface region can in particular be located depending on the chronological location of the signal gap. In particular, the region on the display surface which is concealed by the foreign object 7 can be concluded by the locating of the surface region. A disturbance of the display can then accordingly be signaled when at least a specific predefined part of the display image to be displayed is impaired by the concealment.

Figure 3:
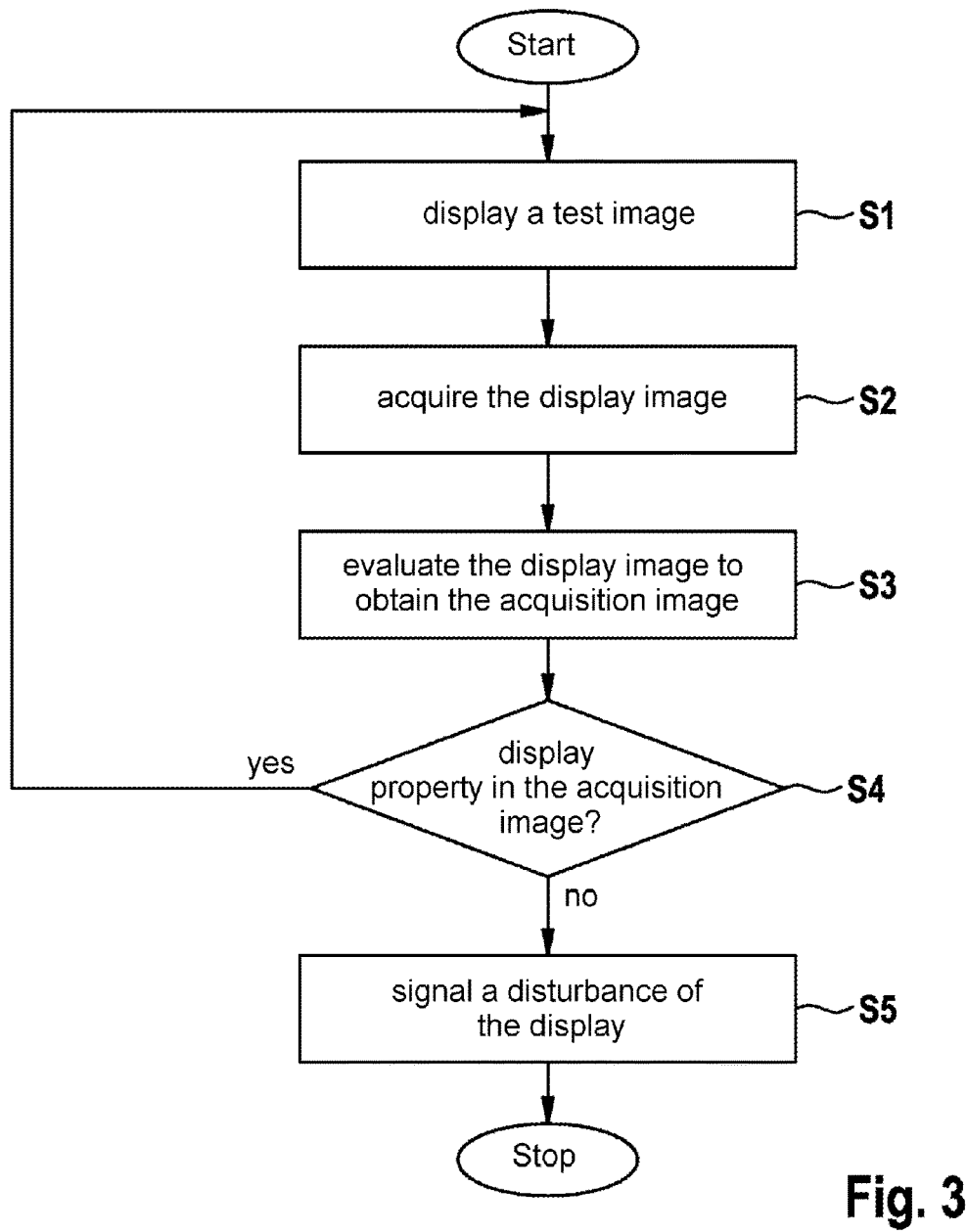
FIG. 3 shows a flow chart to illustrate a method for operating the reflection display system.

A method for detecting a foreign object 7 is shown in the flow chart of FIG. 3, which is executed in the control unit 9 in conjunction with the detection sensor system 10 and the display unit 2.

In step S1, a test image can be displayed in accordance with a specific display property. The display property can correspond to a periodic display of the test image for a display period of time, which is preferably sufficiently short that it cannot be perceived by a vehicle occupant. The display property can also provide a specific overall brightness of the display image or an overall brightness in a specific wavelength range. Alternatively, the test image can also comprise a display in the nonvisible wavelength range.

In step S2, an acquisition of the display image can now be performed with the aid of the detection sensor system 10. The acquisition can provide an image acquisition, for example with the aid of the image acquisition sensor system 10*a*, or a brightness acquisition with the aid of the brightness sensor 10*b*. The acquisition can be provided here by directly directing the detection sensor system 10 on the display surface 3 by indirectly directing the brightness sensor on the display surface 3, for example via the further reflection region R' on the windshield 5, or by directing the detection sensor system 10 on an eye of a vehicle occupant.

In step S3, the direct or indirectly acquired display image is evaluated with respect to the display property in order to obtain an acquisition image. For example, in the case of a periodic display of a test image, the acquisition image is assumed as that display image which has been acquired at the point in time of the output of the test image. The acquisition image can also correspond to a display image acquired in a nonvisible wavelength range.

Alternatively, a brightness of the display image can be acquired and this can be compared for the evaluation to a reference brightness, which results from the display image.

In step S4, it is checked on the basis of the acquisition image or the acquisition brightness in the control unit 9 whether the display property applied to the display of the display unit can be completely confirmed by the acquisition image or the acquisition brightness. If this is the case (alternative: yes), there is thus no concealment of the display surface 3 and the method is continued with step S1. Otherwise (alternative: no), the method is continued with step S5.

In step S5, a disturbance of the display or a concealment of the display surface can be signaled accordingly. The signaling can be carried out with the aid of an optical or acoustic signal or in another way which makes the vehicle occupants aware that the display is at least partially concealed.

In particular, it can be checked in step S4 whether the acquisition image or a sequence of acquisition images correspond to a corresponding test image (at identical display and acquisition points in time) or a sequence of test images (at identical display and acquisition points in time in each case). If it is established that the test image or the sequence of test images corresponds to the acquisition image or the sequence of acquisition images, no concealment of the display image is established. Alternatively, a concealment of the display image is established and a corresponding disturbance of the display by the reflection display system 1 is signals.

Alternatively, it can be checked in step S4 whether the acquisition brightness of a display image at a display point in time corresponds to a reference brightness of the display image at the display point in time. If the acquisition brightness deviates from the reference brightness, at least partial concealment of the display surface 3 can thus be concluded.

LIST OF REFERENCE SIGNS

1 Reflection display system
2 Display unit
3 Display surface
4 Dashboard
5 Windshield
6 Depression
7 Foreign object
9 Control unit
10 Detection sensor system
10*a* Image acquisition sensor system
10*b* Brightness sensor
B Eye region
R Reflection region
R' Further reflection region

The invention claimed is:

1. A reflection display system for displaying a display image for a vehicle occupant of a motor vehicle by reflection of a display image on a windshield, the reflection display system comprising:
   a display unit, which is designed to display the display image on a display surface;
   a detection sensor system for acquiring the displayed display image on the display surface; and
   a control unit, which is designed to
   activate the display unit for display;
   ascertain detection information depending on the displayed display image,
   establish a presence of a foreign object on the display surface of the display unit depending on the displayed display image and depending on the detection information; and
   signal a disturbance of the display when the presence of a foreign object on the display surface of the display unit is established;
   wherein the detection sensor system includes an image acquisition sensor system, which is designed to acquire the display of the display surface directly or indirectly via one or more reflections, wherein the display of the display surface is acquired indirectly via a further reflection region on the windshield or via a reflection in an eye of a vehicle occupant;
   wherein the control unit is designed to activate the display unit to output a test image having a display property, to acquire an acquisition image of the test image as acquisition information, and to check the presence of the display property based on the acquisition image in order to signal a disturbance of the display if the display property is not present with respect to the acquisition image; and
   wherein the display property comprises a periodic display of a test image sequence of multiple test images, which each address different pixels of the display surface, for an imperceptible period of time on the display surface, wherein the control unit is designed to ascertain the display of the test image sequence as the acquisition image, and to determine the presence of the foreign object on the display surface by comparing the acquisition image to the test image sequence.

2. The reflection display system according to claim 1, wherein the display unit is arranged in a depression such that the display image is not perceptible directly in an eye region.

3. The reflection display system according to claim 1, wherein the test image sequence corresponds to a display having different display information than the display image and/or an image having a different display property than the display image, including an overall brightness of the image.

4. The reflection display system according to claim 1, wherein the test image sequence corresponds to a display having different display information than the display image and/or an image having a different display property than the display image, including an overall brightness of the image.

5. The reflection display system according to claim 1, wherein the display property comprises a display of the test image sequence in nonvisible light, wherein the control unit is designed to ascertain the display of the test image sequence in the nonvisible light as the acquisition image and to determine the presence of the foreign object on the display surface by comparing the acquisition image to the test image.

6. The reflection display system according to claim 1, wherein the detection sensor system comprises a brightness sensor, which is designed to acquire an overall brightness of the display image directly or indirectly via one or more reflections as an acquisition brightness, wherein the control unit is designed to ascertain the presence of the foreign object on the display surface depending on the acquisition brightness and a reference brightness.

7. The reflection display system according to claim 6, wherein the reference brightness is ascertained as the overall brightness of the display image to be displayed.

8. A motor vehicle comprising:
a dashboard between a windshield of the motor vehicle and a steering column; and
the reflection display system as claimed in claim 1.

9. A method for detecting a foreign object on a display unit of a reflection display system, which causes a reflection of a display image on a windshield in an eye region of a vehicle occupant, the method comprising:
displaying the display image on the display surface;
acquiring the displayed display image on the display surface by way of a detection sensor system;
ascertaining acquisition information depending on the acquired displayed display image,
establishing a presence of the foreign object on the display surface of the display unit depending on the displayed display image and depending on the acquisition information; and
signaling a disturbance of the display if the presence of the foreign object on the display surface of the display unit is established;
wherein the detection sensor system includes an image acquisition sensor system, which is designed to acquire the display of the display surface directly or indirectly via one or more reflections, wherein the display of the display surface is acquired indirectly via a further reflection region on the windshield or via a reflection in an eye of a vehicle occupant;
wherein the control unit is designed to activate the display unit to output a test image having a display property, to acquire an acquisition image of the test image as acquisition information, and to check the presence of the display property based on the acquisition image in order to signal a disturbance of the display if the display property is not present with respect to the acquisition image; and
wherein the display property comprises a periodic display of a test image sequence of multiple test images, which each address different pixels of the display surface, for an imperceptible period of time on the display surface, wherein the control unit is designed to ascertain the display of the test image sequence as the acquisition image, and to determine the presence of the foreign object on the display surface by comparing the acquisition image to the test image sequence.

* * * * *